United States Patent
Gosangari et al.

(10) Patent No.: US 12,479,779 B2
(45) Date of Patent: Nov. 25, 2025

(54) STEAM INTEGRATION IN ETHANOL TO JET FUEL PROCESS

(71) Applicant: UOP LLC, Des Plaines, IL (US)

(72) Inventors: Saikrishna Laxmirajam Gosangari, Gurugram (IN); Ashish Mathur, Gurgaon (IN); Jeannie Mee Blommel, Oregon, WI (US)

(73) Assignee: UOP LLC, Rosemont, IL (US)

( * ) Notice: Subject to any disclaimer, the term of this patent is extended or adjusted under 35 U.S.C. 154(b) by 98 days.

(21) Appl. No.: 18/457,222

(22) Filed: Aug. 28, 2023

(65) Prior Publication Data

US 2025/0074843 A1 Mar. 6, 2025

(30) Foreign Application Priority Data

Aug. 30, 2022 (IN) ............................. 202211049526

(51) Int. Cl.
 *C07C 1/24* (2006.01)
(52) U.S. Cl.
 CPC ..................................... *C07C 1/24* (2013.01)
(58) Field of Classification Search
 CPC .. C10G 69/12; C07C 1/20; C07C 1/24; C07C 1/00
 See application file for complete search history.

(56) References Cited

U.S. PATENT DOCUMENTS

| | | | |
|---|---|---|---|
| 4,232,179 A | * | 11/1980 | Valladares Barrocas ..................... C07C 1/24 585/639 |
| 8,802,905 B2 | * | 8/2014 | El-Halwagi ............ C10G 50/00 585/318 |
| 2011/0137096 A1 | | 6/2011 | Minoux et al. |
| 2012/0095272 A1 | | 4/2012 | El-Halwagi et al. |
| 2023/0313251 A1 | | 10/2023 | Zebroski |

OTHER PUBLICATIONS

Alexandra Elena Plesu Popescu, "Bioethanol dehydration and mixing by heterogeneous azeotropic distillation", Oct. 20, 2021, Publisher: Journal of Cleaner Production.
Abas Mohsenzadeh, "Bioethylene Production from Ethanol: A Review and Techno-economical Evaluation", Mar. 31, 2017, Publisher: ChemBioEng Reviews.
Search Report and Written Opinion for PCT/US2023/073176 dated Dec. 14, 2023.

* cited by examiner

*Primary Examiner* — Sharon Pregler
(74) *Attorney, Agent, or Firm* — Paschall & Associates, LLC; Mark Goldberg

(57) ABSTRACT

An ethanol dehydration process is provided in which the steam to ethanol ratio is between about 1.0 to 2.0 wt/wt and preferably about 1.5 wt/wt. Steam can be imported from outside the dehydration process such as from an oligomerization or dimerization reaction.

18 Claims, 1 Drawing Sheet

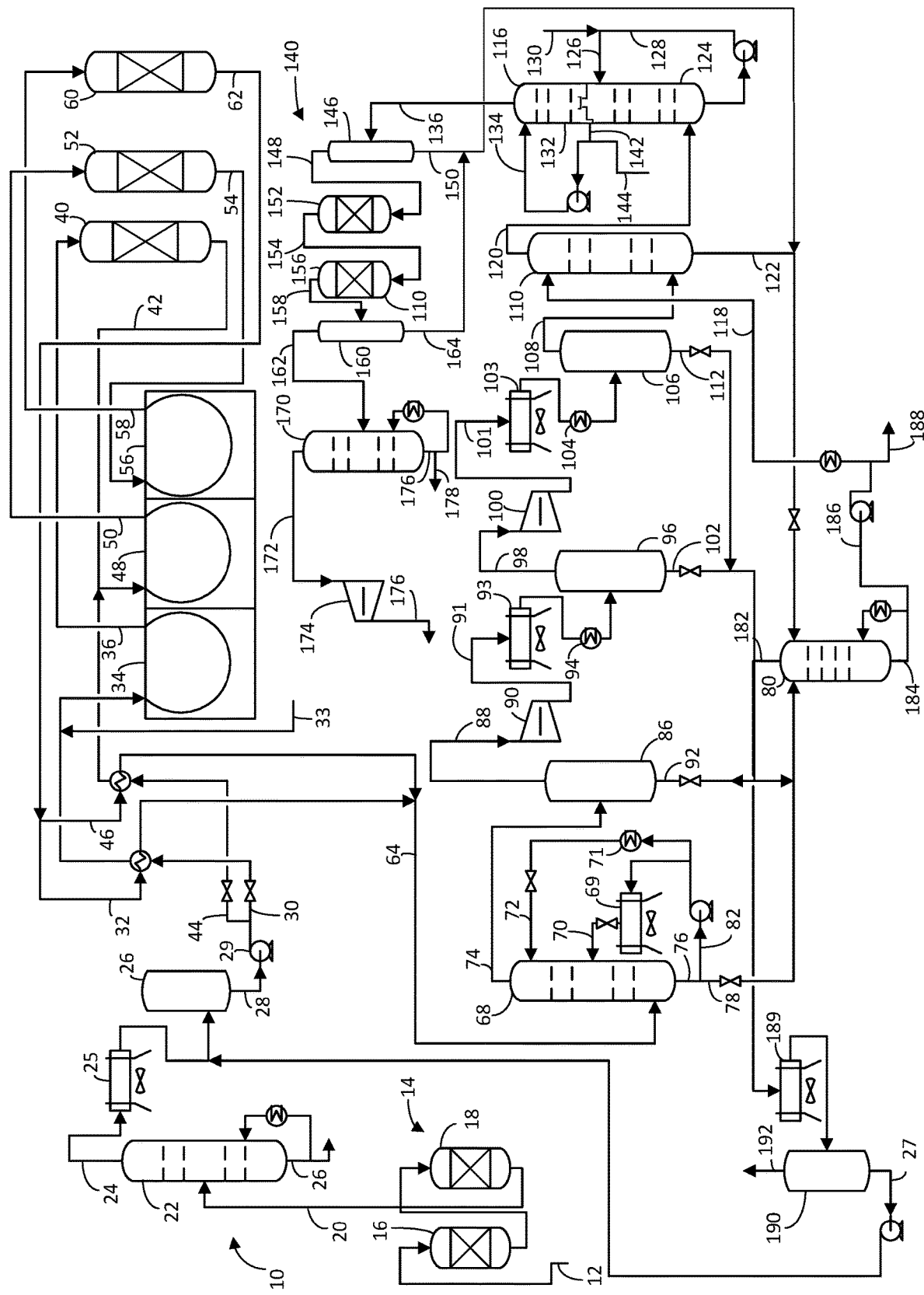

STEAM INTEGRATION IN ETHANOL TO JET FUEL PROCESS

This application claims priority to Indian provisional patent application 202211049526, filed Aug. 20, 2022.

FIELD

The invention relates to an ethanol dehydration process. More particularly, the invention relates to generation of steam from oligomerization and hydrogenation reactions steam integration throughout an ethanol to jet fuel process.

BACKGROUND

Oil and gas refiners worldwide are exploring methodologies and routes to reduce the carbon footprint and are moving towards sustainable processes. An ethanol to jet fuel process is one of the routes that holds promise to minimize or eliminate the customer's carbon footprint. The end product of this process is jet and diesel fuel produced out of bio ethanol. The jet fuel is a sustainable aviation fuel and is intended to replace jet fuel produced out of conventional sources such as crude oil.

There are generally three main steps in the process to convert ethanol to jet fuel. The first is to dehydrate ethanol to produce ethylene. Next the ethylene is converted to long chain olefins and then the long chain olefins are hydrogenated to generate paraffins. This disclosure is mostly concerning the conversion of an ethanol feed stream to paraffins.

SUMMARY

A process is provided for ethanol dehydration comprising adding an amount of steam to an ethanol feed stream wherein a steam to ethanol ratio is between 1.0 to 2.0 wt/wt and reacting said ethanol feed stream at reaction conditions in the presence of a catalyst to produce an ethylene effluent stream.

BRIEF DESCRIPTION OF THE DRAWINGS

FIG. 1 is a schematic process flow diagram of the present disclosure.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, the term "$C_x$" are to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

As used herein, the term "carbon number" refers to the number of carbon atoms per hydrocarbon molecule and typically a paraffin molecule.

DETAILED DESCRIPTION

The ethanol feeds are derived out of either a wet mill or dry mill process. These ethanol feeds can contain a variety of contaminants such as higher alcohols, metals, acetaldehyde, ethyl acetate, etc. In addition, the dry mill feed can also contain fusel oils (heavier alcohols and acids). The ethanol feed may be treated to remove metal contaminants through the use of resin treaters. The heavy hydrocarbon from the fresh feed can be knocked out in a feed purification column.

A fresh ethanol feed is combined with unconverted ethanol and is split into two equal streams into parallel combined feed exchangers. A split reactor configuration is considered because a desired steam to ethanol ratio is maintained at the reactor inlet to maintain the reactor endothermicity as well as ensuring catalyst stability. In order to minimize the combined feed rate to reactor, it becomes essential that the steam intake is reduced. The ethanol dehydration reaction results in generation of water as a byproduct. The ethanol dehydration process needs steam injection in the process to obtain desired catalyst life as well as to maintain operation below maximum endotherm in an adiabatic system. It has been identified that an optimum steam to ethanol ratio should lie between 1.0 to 2.0 wt/wt (preferably about 1.5). In addition to this, some columns in the unit (including the feed purification column and the waste water stripper) can also be reboiled using steam. Since ethanol dehydration reactors operate in a vapor phase, generating steam from the product water may be energy intensive (product water condensation and vaporization). To overcome this issue, it has been concluded that it is preferred to import steam (~100 psig) from outside of the dehydration battery limit. The oligomerization and hydrogenation reactions, being exothermic may be a good source of generating steam and there is a good integration opportunity existing to satisfy the demand for steam.

The oligomerization step of an ethanol to jet fuel process uses a high temperature reactor in an upfront position. Interbed temperature control may be achieved using steam generation. The steam level can be set to 100 psig to cool down a hot effluent at a minimum up to about 370° F. (187° C.). Convection sections of a jet fractionator reboiler can be a good source of steam generation as well.

For a 300 MMGPY ethanol unit, the combined flow of steam is estimated to be ~140 k lb/hr which can satisfy ethanol dehydration steam injection requirements.

In FIG. 1, in accordance with an exemplary embodiment, a process 10 is shown for processing an oxygenate feedstock. The oxygenate feedstock may comprise alcohol and preferably comprises ethanol. The feedstock may comprise a predominance of ethanol and may be aqueous. Preferably, the oxygenate feedstock is a biorenewable feedstock.

A feed line 12 transports an oxygenate stream of oxygenate feedstock to a feed pretreatment section 14. The feed pretreatment section 14 comprises a vessel 16 comprising a bed of cationic exchange resin adsorbent for removing metal contaminants, such as sodium, zinc, phosphates, copper, and calcium from the oxygenate stream in the feed line 12. The feed pretreatment section 14 may comprise an additional vessel 18 with a bed of the same adsorbent for further removing metals from the oxygenate stream. The vessels 16, 18 may be in series or in a lead-lag type of arrangement to allow for regeneration of spent adsorbent. Line 17 transports partially pretreated oxygenate stream from an outlet of vessel 16 to the inlet of vessel 18. A pretreated oxygenate stream exits the feed pretreatment section 14 in line 20 from an outlet of the additional vessel 18 and is fed to a purification column 22. The feed pretreatment section 14 may be operated at a temperature of about 32° C. to about 104° C. and a pressure of about atmospheric pressure to about 670 kPa(g).

In the purification column 22, the pretreated oxygenate stream is fractionated to separate ethanol from heavier oxygenates also known as fusel oil such as cyclohexanol, cyclopentanol, and heavier alcohols and acids. The purification column 22 is operated to minimize ethanol to no more than 1% of feed in bottom stream in line 26. A heavy oxygenate stream in a bottoms line 26 is taken from a bottom of the purification column 22 to heavy oxygenate treatment. The purification column 22 may be reboiled by heat exchange with a suitable hot stream such as steam to provide the necessary heat for the distillation. The purification column 22 provides an overhead gaseous stream of purified ethanol in an overhead line 24 which may be cooled in an air cooler 25 and fed to a feed surge drum 26 along with a recycle ethanol stream in line 27. The purification column 22 may be operated with a bottoms temperature between about 82° C. and about 121° C. and an overhead pressure of about 35 kPa (g) to about 140 kPa (g).

Ethanol in the feed surge drum 26 may be blanketed with nitrogen. A charge pump 29 pumps an ethanol charge stream in line 28 into two charge streams. A first charge stream in line 30 is heat exchanged with a first dehydrated exchange stream in line 32, mixed with steam in line 33 and fed to a first charge heater 34. The first charge heater 34 may be a fired heater and may heat the first charge stream to about 400° C. to about 550° C. A resulting first heated charge stream in line 36 is charged to a first dehydration reactor 40. In the first dehydration reactor 40, ethanol feed is converted to ethylene and water over a dehydration catalyst at a pressure of about 455 kPa (g) to about 630 kPa (g). A first dehydrated stream is discharged from the first dehydration reactor 40 in line 42.

A second charge stream in line 44 is heat exchanged with a second dehydrated exchange stream in line 46, mixed with the first dehydrated stream in line 42 and fed to a second charge heater 48. The second charge heater 48 may be a fired heater and may heat the second charge stream to about 400° C. to about 550° C. A resulting second heated charge stream in line 50 is charged to a second dehydration reactor 52. In the second dehydration reactor 52, ethanol feed is converted to ethylene and water over a dehydration catalyst at a pressure of about 420 kPa (g) to about 700 kPa (g). A second dehydrated stream is discharged from the second dehydration reactor 52 in line 54.

The second dehydrated stream in line 54 is fed to an interheater 56. The interheater 56 may be a fired heater and may heat the second dehydrated stream to about 400° C. to about 550° C. A resulting third heated charge stream in line 58 is charged to a third dehydration reactor 60. In the third dehydration reactor 60, residual ethanol feed is converted to ethylene and water over a dehydration catalyst at a pressure of about 420 kPa (g) to about 700 kPa (g). A third dehydrated stream is discharged from the third dehydration reactor 60 in line 62.

The dehydration catalyst may be an alumina-based catalyst.

The third dehydrated stream is split between the first dehydrated exchange stream in line 32 and the second dehydrated exchange stream in line 46. The first dehydrated exchange stream in line 32 is heat exchanged with the first charge stream in line 30, and the second dehydrated exchange stream in line 46 is heat exchanged with the second charge stream in line 44 and the cooled dehydrated streams are recombined in line 64.

The cooled dehydrated stream in line 64 are fed to a quench tower 68 in which the cooled dehydrated stream is quenched by direct contact with water from a first cooled water stream in line 70 and a second cooled water stream in line 72. A quenched ethylene stream exits in a quench overhead line 74 and a bottoms water stream exits the tower bottoms in line 76. The bottoms water stream is split between a drain stream in line 78 which may be transported to a waste water stripper column 80 through a control valve thereon and a quench recycle stream in line 82. A first portion of the quench recycle stream is air cooled in a product condenser 69 and recycled as the first, lower cooled water stream in line 70 through a control valve thereon, and a second portion of the quench recycle stream is heat exchanged in a trim condenser 71 and recycled to the quench tower 68 as the second, higher cooled water stream in line 72. The quench tower 68 may be operated with a bottoms temperature of about 37° C. (100° F.) to about 104° C. (220° F.) and a pressure of about 280 kPa (gauge) (40 psig) to about 490 kPa (gauge) (70 psig) in the overhead.

The quenched ethylene stream in line 74 is fed to a first stage suction drum 86. In the first stage suction drum ethylene exits the overhead line 88 to a first stage compressor 90 while residual water exits the bottom of the drum in line 92 through a control valve thereon and is transported to the waste water stripper column 80 perhaps via line 78. The first stage compressor 90 compresses the ethylene stream to a first pressure of about 350 kPa (gauge) (50 psig) to about 1225 kPa (gauge) (175 psig) and the discharge in line 91 is cooled in a first stage discharge cooler 93 and a first stage trim cooler 94.

The cooled, compressed ethylene stream from the first stage trim cooler 94 is fed to a first stage discharge drum 96. From the first stage discharge drum 96 ethylene exits in an overhead line 98 to a second stage compressor 100 while residual water exits a bottom of the drum in line 102 through a control valve thereon and is transported to the waste water stripper column 80 perhaps via lines 92 and 78. The second stage compressor compresses the ethylene stream to a second pressure of about 455 kPa (g) to about 3220 kPa (g) and the discharge in line 101 is cooled in a second stage discharge cooler 103 and a second stage trim cooler 104.

The twice cooled, compressed ethylene stream from the second stage trim cooler 104 is fed to a second stage discharge drum 106. From the second stage discharge drum 106 ethylene exits in an overhead line 108 and is transported to a water wash tower 110 while a residual water stream exits the bottom of the drum in line 112 through a control valve thereon and is transported to the waste water stripper column 80 perhaps via lines 102, 92 and 78.

In the water wash tower 110, the twice cooled, compressed ethylene stream is counter-currently washed with cooled, treated water in line 118 from the waste water stripper column 80 to absorb additional oxygenates to produce a washed ethylene stream exiting in an overhead line 120 and a wash water stream in a bottoms line 122. The washed ethylene stream in the overhead line 120 is transported to a caustic scrubber column 116. The wash water stream in line 122 is transported back to the water stripper column 80 through a control valve thereon. The wash water 110 may be operated with a bottoms temperature of about 16° C. to about 82° C. and a pressure of about 2800 kPa (g) to about 3500 kPa (g) in the overhead.

The caustic scrubber column 116 has a lower caustic wash section 124 and an upper water wash section 132. In the lower caustic wash section 124 the washed ethylene stream in line 120 is scrubbed with an aqueous caustic stream from line 126 to absorb acid gases such as carbon dioxide from the washed ethylene stream. Spent caustic is pumped around from the bottom of the lower section in line 128 and replenished with fresh caustic in line 130 to provide the aqueous caustic stream 126. A scrubbed vaporous ethylene stream depleted of acid gases ascends from the caustic wash section 124 to the upper water wash section 132 through a vapor inlet. In the water wash section 132, the scrubbed ethylene stream is contacted with a wash water stream from line 134. A washed, scrubbed vaporous ethylene stream exits the overhead of the water wash section 132 in line 136 and is fed to the product drier section 140. A spent water stream is taken from the bottom of the water wash section 132 in a liquid sump in line 142 and replenished with a fresh water stream from line 144 to provide the wash water stream in line 134 and pumped to the top of the water wash section 124 to be contacted with the scrubbed vaporous ethylene stream. The caustic scrubber column may be operated with a bottoms temperature of about 38° C. to about 43° C. and a pressure of about 2800 kPa (g) to about 2975 kPa (g) in the overhead.

In the product drier section 140, the washed, scrubbed ethylene stream in line 136 is fed to a first drier inlet knock-out drum 146 to remove residual water and provide a drier inlet stream in line 148 and a knock-out water stream in the bottoms line 150 which is fed to the waste water stripper column 80 perhaps via line 122. The drier inlet stream is fed to a first product drier 152 in line 148. The first product drier 152 comprises an adsorbent for adsorbing the water from ethylene in the drier inlet stream in line 148 to provide a dried ethylene stream. The adsorbent may be a molecular sieve material with pore diameters of 2-4 Å. The first product drier 152 may operate in upflow mode. The product drier section 140 may include a second product drier 156 that operates as the first product drier 142. The two product driers may be operated in series but are preferably arranged in a lead-lag operation to facilitate regeneration during continuous operation. The second product drier 156 comprises an adsorbent for adsorbing the water from ethylene like in the first product drier 152. A dried ethylene stream exits the product drier section 140 in a dried ethylene stream in line 158. The product drier section 140 may be operated at a temperature of about 32° C. (90° F.) to about 49° C. (120° F.) and a pressure of about 2758 kPa (gauge) (400 psig) to about 3102 kPa (gauge) (450 psig).

The dried ethylene stream in line 158 is fed to a drier outlet knock-out drum 160 to remove residual water and provide a drier outlet stream in line 162 and a second knock-out water stream in a bottoms line 164 which is fed to the waste water stripper column 80 perhaps via lines 150 and 122.

The drier outlet stream in line 162 may be fed to a heavy oxygenates removal column 170 to separate an overhead stream comprising predominantly ethylene but perhaps higher olefins from heavy ketones and diethyl ether. The olefins are produced in an overhead line 172 and fed to a third stage compressor 174 and a bottoms heavy oxygenate stream is produced in a bottoms line 176. A heavy oxygenate purge stream may be taken in line 178 to heavy oxygenate treatment while a reboil portion is reboiled and fed back to the column 170. A compressed ethylene stream at a pressure of about 2800 kPa (gauge) (400 psig) to about 7000 kPa (gauge) (1000 psig) in a compressor discharge line 176 may be provided to a dimerization section. The heavy oxygenate removal column 170 may be operated with a bottoms temperature of about −20° F.) to about 250° F. and a pressure of about 350 psig) to about 450 psig) in the overhead.

Water streams comprising oxygenates and volatiles in lines 92, 102, 112, 122, 150, 164 may be fed to the waste water stripper column 80 in which volatiles and oxygenates are boiled off to provide an overhead volatile stream in line 182 and a stripped water stream in line 184. A portion of the stripped water stream can be reboiled and fed back to the column to provide necessary heat. A treated water stream in line 186 may be pumped to water outlets in line 188 which includes the cooled, treated water stream in line 118 for the water wash tower 110. The waste water stripper column 80 may be operated with a bottoms temperature of about 93° C. (200° F.) to about 121° C. (250° F.) and a pressure of about 34 kPa (gauge) (5 psig) to about 138 kPa (gauge) (20 psig) in the overhead.

The overhead volatile stream in line 182 may be cooled in an air cooler 189 and fed to an off-gas knock out drum 190.

An overhead stream from the knock out drum 190 in line 192 may be sent to flare while an ethanol recycle stream is pumped to the feed surge drum 26 in line 27 perhaps via line 24.

The invention claimed is:

1. A process for ethanol dehydration comprising:
   splitting an ethanol feed stream into a first charge stream and a second charge stream;
   adding an amount of steam to said first charge stream, wherein a steam to ethanol ratio is between 1.0 to 2.0 wt/wt; and
   reacting said first charge stream and said second charge stream at reaction conditions in the presence of a catalyst to produce an ethylene effluent stream.

2. The process of claim 1 wherein said steam to ethanol ratio is about 1.5.

3. The process of claim 1 wherein a portion of said steam is imported from outside of said ethanol dehydration process.

4. The process of claim 1 wherein said amount of steam is sent from an oligomerization or a hydrogenation reaction.

5. The process of claim 3 wherein a level of steam is set to 100 psig.

6. The process of claim 5 wherein said steam level cools down a hot effluent from outside of said ethanol dehydration process at a minimum up to about 187° C.

7. The process of claim 1 wherein a total flow of steam is about 200,000 lb/hr.

8. The process of claim 1 wherein a portion of said steam is produced by a wastewater stripper and then heated in an oligomerization section.

9. The process of claim 8 wherein a portion of water is removed to minimize buildup of impurities.

10. The process of claim 1 wherein said steam is produced in a dedicated steam generator.

11. The process of claim 10 wherein said steam is further heated by exchanging heat with an olefin splitter bottom in a stream superheater.

12. The process of claim 3 wherein at least five steam generators are used to generate said steam.

13. The process of claim 12 wherein a recycle steam generator cools down a hot diesel stream coming from a flash stripper feed-recycle oil exchanger to generate said steam outside of said ethanol dehydration process.

14. The process of claim 12 wherein a first stage oligomerization lag reactor intercooler steam generator removes heat of reaction from a first stage oligomerization lead reactor top bed effluent to generate said steam outside of said ethanol dehydration process.

15. The process of claim 12 wherein a first stage oligomerization lag reactor intercooler steam generator removes heat of reaction from a first stage oligomerization lag reactor top bed effluent to generate said steam outside of said ethanol dehydration process.

16. The process of claim 12 wherein a first stage oligomerization reactor effluent cooler steam generator removes heat of reaction from a first stage oligomerization lag reactor bottom bed effluent to generate said steam outside of said ethanol dehydration process.

17. The process of claim 1, wherein said first charge stream is charged to a first dehydration reactor and a second charge stream is charged to a second dehydration reactor.

18. The process of claim 17 further comprising:
   taking a first dehydrated stream from the first dehydration reactor;
   mixing said second charge stream with said first dehydrated stream; and
   charging a resulting second charge stream to the second dehydration reactor.

* * * * *